United States Patent Office 3,795,718
Patented Mar. 5, 1974

3,795,718
METHOD OF RETARDING DEGRADATION OF MOLD SURFACE
William J. Hampshire, Peninsula, Ohio, assignor to The Goodyear Tire & Rubber Company, Akron, Ohio
Filed Jan. 10, 1972, Ser. No. 216,442
Int. Cl. B08b 3/02
U.S. Cl. 264—39  2 Claims

ABSTRACT OF THE DISCLOSURE

Method for retarding the fouling or degradation of the surface of a concave mold and removing resulting deposits therefrom, where said mold and deposits are formed by contacting mold surface in presence of water and carbon dioxide with a polyamine having primary amino groups and comprising the sequential steps of:

Figure 1:
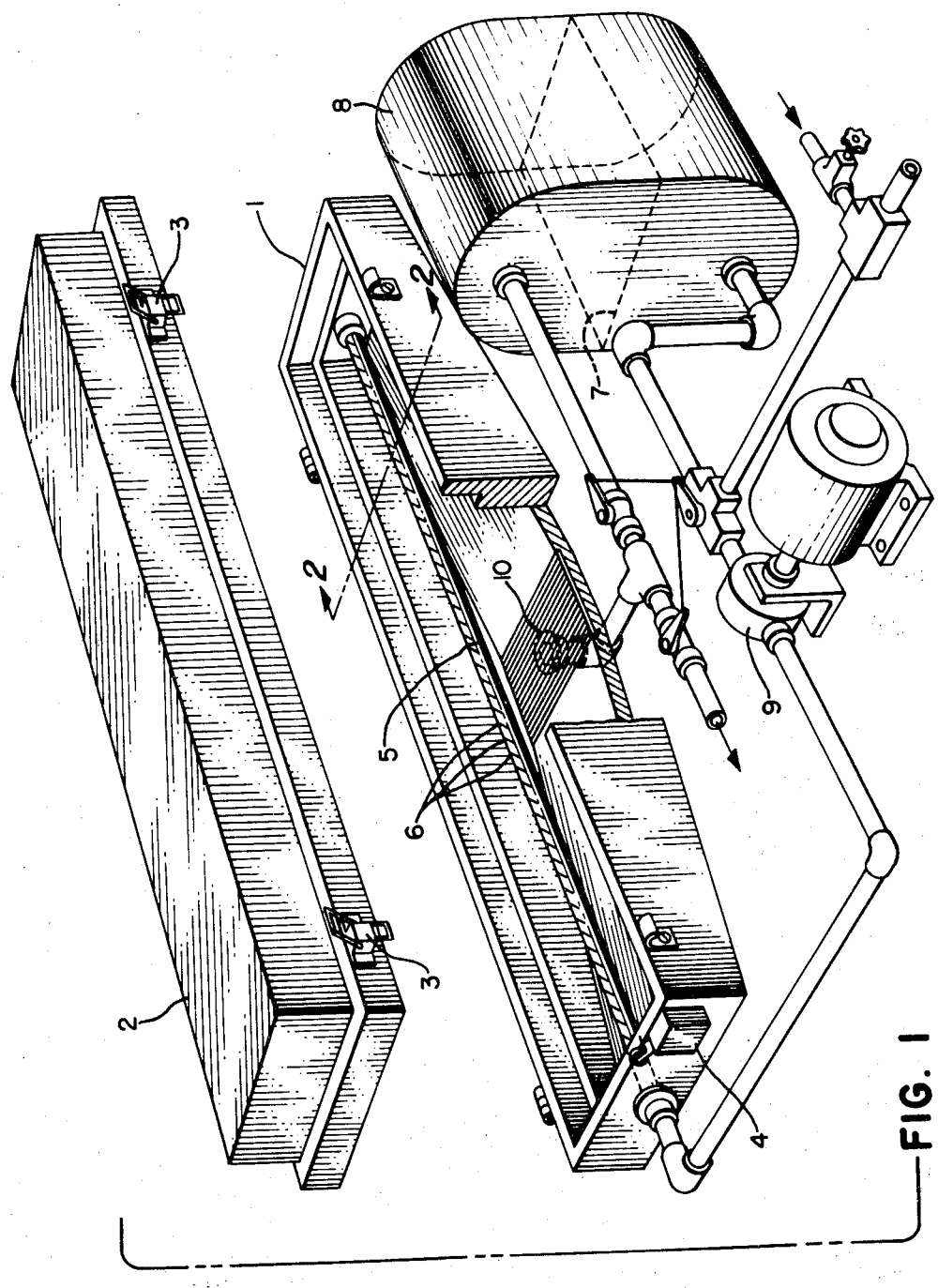

(A) positioning said mold in a substantially enclosed container, said container having an internal spray source positioned therein and directed into the mold cavity,
(B) actuating a high velocity jet of liquid organic wash from said spray source to forcibly impinge upon the mold surface with sufficient velocity characterized by providing a turbulent condition of the wash in at least about 80 percent of the cavity when the mold is submerged in the wash, where said organic acid is selected from formic acid, acetic acid, and propionic acid, and,
(C) Removing treated mold from container.

---

The invention is particularly utilitary for removing deposits resulting from molding polyurethane reaction mixtures containing primary diamines, where the deposits are apparently adhered to the mold surface by both chemical and physical means.

This invention relates to a method of retarding the fouling or degradation of a substrate surface caused by its exposure to compositions or mixtures containing compounds having primary amino groups. It further relates to rejuvenating such fouled surfaces.

Mold surfaces typically become gradually fouled by successively molding articles thereon which contain compounds having primary amino groups. Such molds eventually become modified to the extent that not only do their surfaces impart progressively inferior decorative definitions to the surfaces of the molded articles, but in addition, their ability to easily release such molded articles becomes inhibited. This effect is particularly extensive when such articles are prepared by molding and curing liquid polyurethane mixtures containing primary polyamines.

It has been previously discovered that such fouling can be retarded and resulting deposits substantially removed by treating with certain organic acids (U.S. Pat. 3,475,-217).

However, even this previous treatment has not been found to be entirely practical for commercial applications which require frequent treatments within a short period of time to maintain critical mold surface definitions and to maintain sufficiently safe operation standards.

In accordance with this invention, it has been discovered that such treatment of the fouled mold surfaces, and actually a rejuvenation of said surfaces, can be substantially more efficiently accomplished by violently applying organic acids selected from formic, acetic and propionic acids, to the mold surface with sufficient potential energy to both penetrate and minimize any relatively stagnant boundry layer of active acid and degraded products and to cause an erosion of adherent degraded products on the mold surface.

It is not fully understood how the contaminating deposits adhere to the mold surface. However, because of the discovered results of the practice of this invention, it is believed that the deposits are bonded to the mold by both chemical and physical means. Apparently the concentrated acid provides the chemical means whereas the potential energy of its high velocity jet vigorously attacks the substrate surface to effect an eroding action and enhances the removal of the adherent contamination. Thus the invention provides both a chemical and a fluid mechanical type of treatment to enhance deposit removal and rejuvenation of the surface.

Therefore, it has been discovered that a method for retarding the fouling of the surface of a concave mold having a generally open mold cavity and removing resulting deposits therefrom, where the said fouling and deposits are formed by contacting the mold surface in the presence of water and carbon dioxide with a polyamine compound having primary amino groups, comprising the sequential steps of:

(A) positioning said mold in a substantially enclosed container to enable liquid contained in the mold to drain by gravity flow from its open cavity, said enclosed container having an internal spray source positioned therein directed into said open mold cavity,
(B) actuating a high velocity jet of concentrated liquid organic acid wash from said internal spray source into the mold's open cavity to forcibly impinge upon and wash the concave mold surface with sufficient velocity characterized by providing a turbulent condition of the acid wash in at least about 80 and preferably at least 90 percent of the cavity when the mold is submerged in the acid wash, said acid wash being drained by gravity flow from the mold cavity, where the acid wash comprises at least one organic acid selected from at least one of the group consisting of formic acid, acetic acid and propionic acid, and
(C) removing the treated mold from the container.

Thus, this invention can be practiced with the liquid acid wash level maintained either below the substantially inverted concave mold being treated or up to a sufficient level to immerse the mold in the acid so long as sufficient potential energy is provided by the velocity of the directed acid wash to enable a violent turbulent condition to be maintained within at least about 80 percent of the cavity if the mold is submerged.

The required turbulent condition when the mold is immersed is readily definable by well-known fluid mechanics. Turbulence is the region of velocity at or above a critical velocity where the motion of the fluid ceases to be essentially linear or streamline in nature and becomes turbulent. It is recognized that in the turbulent condition the fluid swirls, generally mixing the flow path into erratic and varying courses throughout the cavity.

For the practice of the invention where the liquid acid wash level is maintained below the mold being treated, the velocity of the acid is generally sufficient to enable treatment with a pressure at the mold surface of at least about 10 pounds per square inch and more preferably in the range of about 15 to about 40 pounds per square inch but not sufficient to damage the mold surface itself.

For operational control of the process of this invention, the level of the liquid acid wash is conveniently regulated by control of the rate of removal of acid and degraded products from the bottom portion of the container having the concave mold positioned therein.

Figure 2:
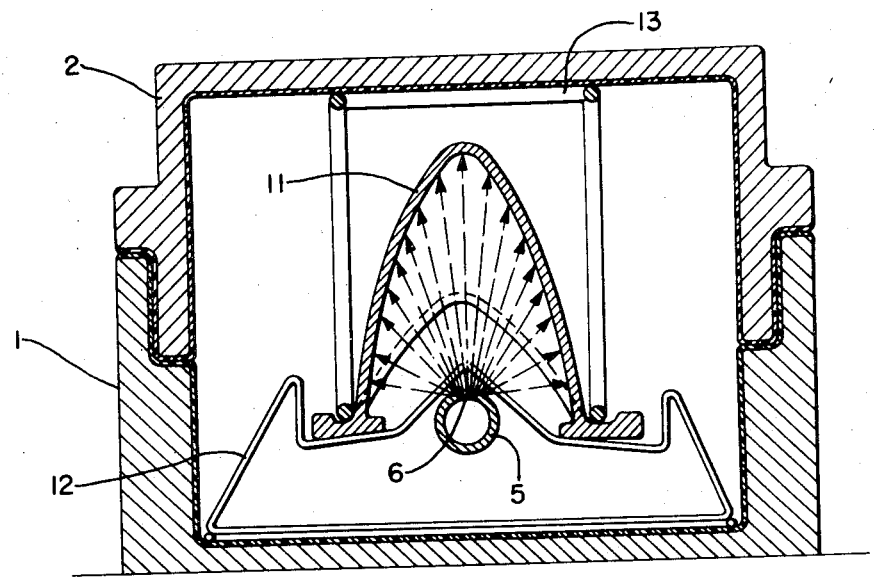
Figure 3:
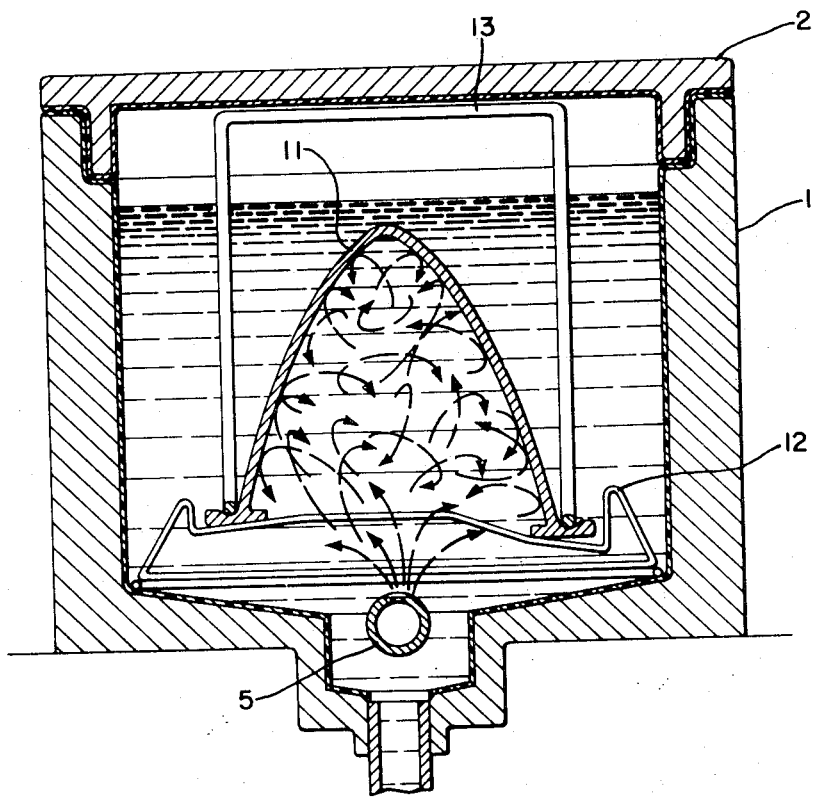

For further understanding of the invention, reference is made to the drawings in which FIG. 1 is an isometric representation of a mold treating apparatus of this invention and FIGS. 2 and 3 are end views of such apparatus with an inverted concave mold therein taken along line 2—2 of FIG. 1.

With reference to the drawings, there is provided a rectangular container 1 with a top cover 2 adapted by hinges to fit tightly over the container 1 with locking latches 3 in a manner to actuate a safety electrical switch 4 which is otherwise maintained in the "off" position when the top is removed. This enables the operation of the treating system only when the container is closed.

Inside the rectangular container 1 is longitudinally and horizontally fitted a metal tube 5 having spaced slits 6 cut in its upper side at an angle to its axis in order to provide an overlapping fan-shaped spray. If desired the slits can be replaced with V-shaped nozzles. Outside of the container 1 is a reservoir 7 of concentrated organic acid wash maintained in a storage tank 8 which is mechanically fed under pressure to the longitudinal tube 5 inside the container 1 through a centrifugal pump 9. The acid wash is sprayed from the slits 6 at a high velocity and allowed to drain by gravity from the sump 10 of the container 1 and return to the storage tank.

In the operation of this invention, a concave mold 11 with deposits thereon caused by exposure in the presence of water and carbon dioxide to primary polyamines is placed in an inverted position on a retainer 12 over the longitudinal tube 5 and held downward in place by a retaining screen 13. The pump 9 is then electrically actuated to continuously force the acid wash under pressure to the tube 5 from which it is sprayed at a high velocity onto the inner concave surface of the mold. In FIG. 2 it is demonstrated how the acid wash is forced from the tube 5 with sufficient velocity and potential energy to impinge against the concave walls of the inverted mold and chemically and physically remove the contamination through the action of both the acid and force of the liquid spray. In FIG. 3 it is shown a similar operation where the liquid level of acid wash within the container 1 is allowed to rise by controlling the rate of drain from the sump and envelop the inverted mold. In this figure it is demonstrated how the acid wash is forced from the tube 5 with sufficient velocity and potential energy to cause a violent turbulence against the concave mold surface.

Exemplary of the primary polyamines which concern this invention are substituted methyl amine compounds characterized by the test which comprises forming one liter of a solution containing from about 10 to about 20 parts by weight of the substituted methyl amine compound per 100 parts by weight of methylethyl ketone, aging the solution for 8 hours at 25° C., warming the solution to 40° C. and passing gaseous carbon dioxide at about 25° C. through the solution at a rate of about one gaseous liter per minute to form a turbidity in the solution within 60 minutes.

Representative substituted methyl amine compounds have the structure of the Formula (1):

(1)
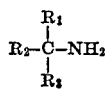

where $R_1$, $R_2$ and $R_3$ are individually selected from the group consisting of (a) hydrogen radicals, alkyl, cycloalkyl, cycloalkyl, aryl, alkaryl, and aralkyl radicals. Representative of such radicals are alkyl radicals having from 1 to 40 carbon atoms such as methyl, ethyl, propyl, isopropyl, butyl, isobutyl, amyl, isoamyl, hexyl, isohexyl, heptyl, octyl, duodecyl and tetracontyl radicals; cycloalkyl radicals such as cyclobutane, cyclopentane, cyclohexane, cycloheptane and cyclooctane; aryl radicals such as phenyl and naphthyl radicals; alkaryl radicals such as tolyl and xylyl radicals, and aralkyl radicals such as benzyl radicals; and (b) substituted alkyl, cycloalkyl, aryl, alkaryl, and aralkyl radicals where the substituents are selected from at least one of the group consisting of hydrogen, carbon, oxygen, sulfur, fluorine, chlorine, bromine, iodine, and phosphorous. Representative examples of such substituted radicals are amino radicals, imino radicals, and radicals containing amino groups, imino groups, halo groups, ether groups, and thioether groups.

The preferred substituted methyl amines are all primary diamines having their amino groups attached to nonbenzenoid carbon atoms which produce turbidity in the hereinbefore described test.

Further representative examples of the said substituted methyl amine compounds are compounds prepared by the method which comprises reacting the substituted methyl amine compound of Formula (1) with an aldehyde or ketone. Various aldehydes can be used, representative of which are formaldehyde, acetaldehyde, propionaldehyde and benzaldehyde. Various ketones can be used representative of which are acetone, methyl ethyl ketone, methyl isobutyl ketone, diisobutyl ketone, methyl n-amyl ketone, methyl-i-amyl ketone and acetophenone. These compounds are generally called aldimines and ketimines.

Representative examples of the various substituted methyl amine compounds are ethylene diamine, hexamethylene diamine and dimethyl hexamethylene diamine; isophorone diamine, 1,4-cyclohexane bis methyl amine, 4,4'-diamino-dicyclohexyl methane, meta xylene diamine, para-xylene diamine, tetrachloroparaxylene diamine, cyclobutane-1,2 bis methyl amine, menthane diamine, imino bis propylamine, bis(amino propyl) piperazine, isophorone diamine, diethylene triamine, triethylene tetramine and tetraethylene pentamine.

Treatment is preferably effected with the concentrated acids although a mixture of the acid and a solvent can be used. Suitable organic solvents are preferably substantially inert solvents which will help penetrate the harmful deposits, in which the acid is soluble to at least 10 percent by weight of the acid at 25° C. and do not detrimentally chemically react with or excessively dissolve the substrate. If a solvent is used, usually the acid-solvent mixture contains up to about 30 weight percent and preferably up to about 10 weight percent solvent. Representative examples are liquid saturated and unsaturated aliphatic hydrocarbons, liquid cycloaliphatic hydrocarbons, liquid halo-substituted saturated and unsaturated aliphatic hydrocarbons, liquid aromatic hydrocarbons, liquid halo-substituted aromatic hydrocarbons, liquid ketones, carbon disulfide and their mixtures.

The various liquid halo-substituted hydrocarbon solvents, particularly the chloro-substituted olefins, are also useful in the practice of this invention for mixing with the said amine compounds, exemplary of which are dichloroethylene trichloroethylene, 1,1,2,2-tetrachloro methylene, chloroform, methyl chloroform, dichloro methane, 1,2-dichloro ethane, trichloro ethane and 1,1,2,2,-tetrachloroethane.

Representative of saturated aliphatic hydrocarbon solvents are liquid hydrocarbons containing from 4 to 8 carbon atoms such as pentane, hexane, heptane, and octane; representative of unsaturated aliphatic hydrocarbons are those containing from 5 to 8 carbon atoms such as pentene, hexene, heptene and octene; representative of cycloaliphatic solvents is cyclohexane; representative of aromatic hydrocarbons are benzene, toluene and xylene; representative of liquid ketones are acetone, methyl ethyl ketone, methyl isoamyl ketone, methyl isobutyl ketone and diisobutyl ketone; representative of liquid alcohols are methanol, ethanol, n-propanol, isopropanol, n-butanol and isobutanol.

When the organic acids are used in the absence of solvents or used as a mixture with solvents, it is preferred that the organic acids and the mixtures of organic acids and solvents contain less than about 20 percent by weight of water based on the acid and more preferably that they are essentially water-free although traces of water can be present such as up to about 10 percent by weight of water based on the acid.

The organic acids and their mixtures and with a solvent if desired can be used to treat the substrate or modified substrate at various temperatures, such as 0° C. to 100° C., although it is usually more desirable to effect the treatment at a temperature of from about 20° C. to 80° C. Various pressures can be used, such as atmospheric or above or below atmospheric. Usually the autogenous pressure developed by the system is satisfactory.

Various substrate surfaces having the deposits formed therein can be treated by the method of this invention. The invention has particular utility where the substrate surface is a polymeric material. It is preferred that the substrate surface is suitable for molding articles and therefore not chemically reactive with the compounds used to prepare the molded articles. It is also preferred that the substrate surface will not tightly adhere to the molded articles. For example, if the molded articles are to be of an epoxy compound or of polyurethane, it is usually desired that the substrate will not tightly adhere to an epoxy compound or to a polyurethane when cured. Substrates for this purpose can have surfaces of materials known to those skilled in the art which do not tightly adhere to molded epoxy compounds and polyurethanes such as polyethylene, polypropylene and silicone rubber or the substrates can be made of these materials or other materials which have a surface coated with various suitable release agents and parting films also known to those skilled in the art.

A wide range of other substrate surfaces can be used which are preferably coated with the release agents and used to mold articles. Such substrate surfaces are known to those skilled in the art. Representative examples of such various substrate surfaces include the various solid metals and their alloys, cured millable gum silicone rubbers, cured natural rubber and rubber-like polymers, thermoplastic polymeric materials and thermoset plastic materials.

Most, if not all, of the substrate materials have pores in their surfaces and therefore are permeable to some degree. Representative examples of some of the various metals are aluminum, iron and their alloys. Representative of the various rubber-like polymers are rubbery polyurethanes and rubbery cured polymers and copolymers such as rubbery polymers of conjugated dienes including polybutadiene, polyisoprene, chloroprene, copolymers of butadiene and isoprene which contain a major portion of butadiene, particularly copolymers of butadiene and styrene of the hot and cold SBR type which contain from about 60 to about 90 percent by weight of butadiene, copolymers of butadiene and acrylonitrile, butyl rubber, which is a polymerization product of a major portion of a monoolefin such as isobutylene and a minor portion of a diolefin such as butadiene or isoprene copolymers of ethylene and propylene, and terpolymers of ethylene, propylene and a diene. Representative of the various thermoplastic and thermoset polymers are the polyurethanes, the various epoxide resins and epoxide varnishes, polymeric polyesters and polymers formed by the open ring polymerization of unsaturated alicyclic compounds having from one through three carbon-to-carbon double bonds in the alicyclic ring such as polyoctenamers and polydodecenamers.

Representative of the various release agents for the substrate surfaces are those that do not adhere to the epoxy compounds and polyurethanes and which do not react with polyurethane reactants and epoxy compounds to reduce the flexibility, tear, tensile strength and cold temperature properties of cured polyurethane compositions and epoxy compounds. Any of the many releasing agents or parting agents known to those skilled in the art to be useful in preparing epoxy and polyurethane castings may be used in this invention provided they meet the above requirements.

Some of the many suitable release agents include the polyethylene and polypropylene waxes and emulsions, natural waxes, synthetic waxes, dimethyl silicone fluids, greases and higher polymers, soya bean fatty acid types or vegetable cephalin and lecithin, soaps, fluorocarbons, polyvinyl alcohol and fluorosilicones.

In the practice of this invention, it has been found that even if a substrate is coated with a release agent, when the release agent coating is contacted in the presence of water and carbon dioxide with the substituted methyl amine compounds, the release agent coating can apparently be penetrated and the surface of the substrate can still become modified by the formation of the deposits on the surface and within the pores of the substrate. When the surface of a substrate becomes modified with deposits in this manner the surface definition of the substrate is reduced and molded articles are more difficult to release from the substrate. Such modified substrate surfaces can be treated by the method of this invention to substantially remove the so-called deposits when formed on the substrate surface or within its pores, following which a release agent coating can be reapplied to the substrate surface.

As hereinbefore described, the deposits formed on and within substrate surfaces prepared from silicone rubbers can be treated by the method of this invention. Silicone rubbers are a class of materials well known to those skilled in the art as rubbery cured poly(organosiloxanes). The silicone rubbers are particularly suitable substrates for molding epoxy and polyurethane articles because they can form flexible substrates which do not tightly adhere to such articles after the articles are molded. Such substrates may be produced by curing room temperature vulcanizing liquid silicone rubbers or millable gum silicone rubbers well known to those skilled in the art.

Representative of the room temperature vulcanizing liquid silicone rubbers are those described as organopolysiloxane compositions containing silicon-bonded hydroxyl siloxane compositions containing silicon-bonded hydroxyl groups which can be cured by metal salts of organic carboxylic acids, by quaternary ammonium compounds or by epoxide-containing compounds in the presence of primary, secondary or tertiary amines.

In general, these silanol-containing organopolysiloxanes contain an average of from about 1.0 to 1.98 organic groups attached to silicon through silicon-carbon linkages, and contain an average of from 0.01 to 1 silicon-bonded hydroxyl groups per silicon atom. Alternatively, some of the silicon-bonded hydroxyl groups can be replaced with alkoxy groups or with pendant hydrogen atoms.

These compositions can be described as having the average formula (1) 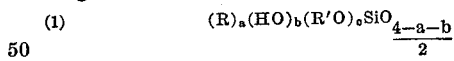

where R is a monovalent hydrocarbon radical or a substituted monovalent hydrocarbon radical, R′ is an alkyl radical containing from 1 to 8 carbon atoms, $a$ has a value of from 1.0 to 1.98, $b$ has a value from 0.01 to 1, $c$ has a value of from 0 to 0.09, the sum of $b+c$ is from 0.01 to 1, and the sum of $a+b+c$ is from 1.01 to 2.1. Included among the radicals represented by R are, for example, alkyl radicals, e.g., methyl, ethyl, propyl, butyl, octyl, decyl, etc., radicals; aryl radicals e.g., phenyl naphthyl, xylyl tolyl, etc., radicals; aralkyl radicals, e.g., benzyl, phenyl-ethyl, styryl, etc., radicals; alkenyl radicals e.g., vinyl, allyl, etc., radicals; cycloaliphatic hydrocarbon radicals e.g., cyclohexyl, cycloheptyl, cyclohexenyl, etc., radicals; cyanoalkyl radicals, e.g., cyanoethyl, cyanomethyl, cyanopropyl, etc., radicals; halogenated monovalent hydrocarbon radicals, e.g., chloromethyl, bromomethyl, chloroethyl, chlorophenyl, tetrachlorophenyl and dibromophenyl radicals.

Representative of the millable silicone rubber gums are those described as: organo-substituted polysiloxanes, commonly called dialkyl or alkyl-aryl polysiloxane gums. The substituted groups are usually at least 50 percent in number methyl groups. The remainder of the groups are usually methyl or methyl with 5 to 20 percent phenyl or methyl with phenyl and vinyl, or methyl, vinyl or cyanopropyl groups, methyl vinyl and ethyl groups, or methyl and trifluoropropyl groups. The millable silicone rubber gums can be shown by the empirical formula

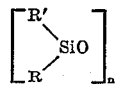

where R and R' are selected from the class consisting of the methyl and ethyl groups, the halogen and nitrile substituted alkyl groups containing from 1 to 4 carbon atoms, phenyl, halogenated phenyl, vinyl and cyclohexenyl groups and $n$ is a large number. R and R' may, if desired, be predominantly or entirely methyl groups.

The milliable gum silicone rubbers are generally cured by reacting the poly(organosiloxane) with a peroxide such as 2,4-dichlorobenzoyl peroxide, di-(tertiarybutyl)perbenzoate, tertiarybutyl perbenzoate, benzoyl peroxide or dicumyl peroxide. Usually about from 0.5 to 15 and preferably 1.0 to 3.0 parts of curing agent per 100 parts by weight of silicone rubber are used, depending on the percentage of unsaturated substitution present.

Various fillers can be added to the silicone rubber before curing, typical of which are, for example, fume silicas, silica areojels, organo-silane modified silicas, barium and cadmium titanates, zirconates and stannates; diatomaceous earth, clays, calcium carbonate, finely ground quartz, barites, iron oxide, zinc oxide, titanium dioxide and mixtures thereof.

The cured silicone rubbers have various physical properties. For example, they may have tensile strengths from about 100 to about 1000 pounds per square inch, elongations of from about 100 to 600 percent and a Durometer hardness, Shore A scale of from about 20 to about 60.

It has been found that if the substrate surface having the deposit thereon is a silicone rubber, it is preferred that the organic acids are concentrated so that they will wet and penetrate the silicon rubber surface. Preferably they contain less than about 5 weight percent of water based on the acid.

When molded polyurethane articles are prepared by applying a polyurethane reaction mixture containing at least one of the substituted methyl amine compounds to a substrate mold surface in the presence of atmospheric water and carbon dioxide, curing the reaction mixture and removing the molded polyurethane article from the mold, the harmful deposits can progressively form and build up on the substrate surface and adhere to successive molded articles. Diamines having amine groups attached to nonbenzenoid carbon atoms are used as curatives or chain extenders for polyurethanes and therefore are used to form polyurethane reaction mixtures.

The polyurethane reaction mixtures which can be used in the practice of this invention to prepare mold substrate surfaces and which can be used to prepare molded articles on substrate surfaces are those to be primary diamine cured and can be prepared from materials which comprise a reactive hydrogen-containing polymeric material, an organic polyisocyanate and at least one of the substituted methyl amines which are diamines having amino groups attached to nonbenzenoid carbon atoms. Hydroxyl terminated aliphatic and aromatic diols having 2 to 12 carbon atoms can be added. It is to be understood that the polyurethanes referred to in this specification may also contain polyurea linkages.

In the practice of this invention, a nonreactive solvent, particularly a liquid chloro-substituted olefin can be added to the polyurethane mixture so that it will be fluid. The preferred chloro-substituted olefins have been hereinbefore described as those desired for mixing with the said amine compounds.

Generally, sufficient solvent is added to form a solution containing from about 35 to about 65 percent solids. However, a higher or lower concentration of solids can be used, depending upon the reactants used and upon the intended use of the solution.

The reactive hydrogen-containing polymeric material used comprises at least one member selected from the group consisting of polyester polyols, polyether polyols, hydroxyl terminated polymers of conjugated diene hydrocarbons having a hydroxyl functionality of 2 to 3, and castor oil. The reactive hydrogen-containing material generally used has a molecular weight between about 700 and about 5000 and, usually, between about 1000 and about 3000. Generally the polyester polyols are the preferred active hydrogen-containing material where high strength and solvent resistance are desired.

Representative examples of polyester polyols are the condensation products of low molecular weight polyols with an organic polycarboxylic acid or anhydride. Representative low molecular weight polyols are glycols having 2 to 12 carbon atoms such as ethylene glycol, propylene glycol, butylene glycol, pentylene glycol, decamethylene glycol, etc. Representative examples of the organic dicarboxylic acids that can be used are succinic acid, glutaric acid, adipic acid, phthalic acid, terephthalic acid, isophthalic acid, suberic acid, sebacic acid, pimelic acid, and azelaic acid. The anhydrides of such acids can be used in place of the acid. If desired, from about 1 to 20 percent by weight of a triol or higher polyfunctional polyol or polyfunctional acid can be present to produce branching in the polyurethane polymer.

Polyether polyols useful in preparing the polyurethanes used in this invention can be prepared by polymerizing or copolymerizing alkylene oxides having 2 to 4 carbon atoms such as ethylene oxide, propylene oxide, butylene oxides, and tetrahydrofuran by polymerizing or copolymerizing the low-molecular weight glycols, or by the reaction of one or more such alkylene oxides with the glycols or with triol, or with a polycarboxylic acid such as phthalic acid. The polyether polyols include polyalkylene-aryl ether glycols or triols, polytetramethylene ether glycols, polyalkylene ether-thioether glycols or triols, and alkyd resins. Generally, the polytetramethylene ether glycols are the preferred polyether glycols.

Representative examples of hydroxyl terminated polymers of conjugated diene hydrocarbons are hydroxyl terminated polymers of isoprene and butadiene and their copolymers with minor amounts of vinyl compounds such as styrene and acrylonitrile.

The organic polyisocyanates used to prepare the polyurethanes generally have an isocyanate content of 2 to 3 including various organic diisocyanates and mixtures thereof. Generally the organic diisocyanates are preferred. The organic polyisocyanates can be aromatic, aliphatic, or cycloaliphatic or combinations of these types.

Representative examples of such polyisocyanates include the toluene diisocyanates, m-phenylene diisocyanate, 4-chloro-1,3-phenylene diisocyanate, 4,4'-tetramethylene diisocyanate, 1,6-hexamethylene diisocyanate, 1,10-decamethylene diisocyanate, 1,4-cyclohexylene diisocyanate, 4,4'-methylene bis (cyclohexylisocyanate) and 1,5-tetrahydronaphthalene diisocyanate, and mixtures of such diisocyanates. For the purpose of the present invention, the toluene-diisocyanates, diphenylmethane-4,4'-diisocyanate and 3,3' - dimethyl - 4,4' - bisphenylene diisocyanate, are generally preferred although the diisocyanate having isocyanato groups connected to non-benzeneoid carbon atoms are preferred where color retention is important.

The polyurethane polymers are usually prepared by the well-known one shot, modified prepolymer and the prepolymer methods. For example, they can be prepared by forming a liquid polyurethane reaction mixture by reacting a reactive hydrogen-containing polymeric material with a polyisocyanate to form an isocyanate-terminated polyurethane which is then mixed with the diamine. The reaction mixture is then cured to form the polyurethane polymer. The isocyanate-terminated polyurethanes can be prepared by reacting the reactive hydrogen-containing polymeric material with the organic polyisocyanate in proportions such that the ratio of isocyanate groups to the reactive hydrogen-containing groups of the reactive hydrogen-containing polymeric material is from about 1.1/1 to about 12/1 and preferably about 1.2/1 to about 2.5/1. These materials are generally reacted at temperatures from about 20° C. to about 150° C. The reactive hydrogens of the reactive hydrogen-containing polymeric material are supplied by hydroxyl groups and amino groups.

Any of the nonreactive solvents normally used in making paints which are suitable for spraying are useful as diluents for the isocyanate-terminated polyurethanes of this invention. Representative examples of these are benzene, toluene, the paraffinic naphthas, the naphthenic naphthas, the aromatic naphthas, ethyl formate, propyl formate, butyl formate, amyl formate, ethyl acetate, propyl acetate, methyl acetate, butyl acetate, amyl acetate, acetone, methyl ethyl ketone, diethyl ketone, methyl isoamyl ketone, Cellosolve acetate, dioxane, lower nitraparaffins, etc. Mixtures of solvents may be used to obtain satisfactory spreading properties and evaporation rates, particularly when the polyurethane is to be used as a spray composition and applied to a suitable surface.

The isocyanate-terminated polyurethane, sometimes called a prepolymer, is usually dissolved or dispersed in the solvent to form a solution or dispersion which is then reacted with the diamine to form a cured polyurethane. The diamine is usually added to the isocyanate-terminated polyurethane in a ratio of from about 0.5/1 to about 1.5/1 and, preferably, about 0.8/1 to about 1.1/1 amine groups of the diamine for each isocyanate group in excess of the reactive hydrogen groups of the reactive hydrogen-containing polymeric material.

The following illustrative example is set forth to further exemplify the objects and advantages of the invention. The parts and percentages are by weight unless otherwise indicated.

EXAMPLE I

A rectangularly-shaped box container constructed of pineboards was assembled having a length of about 12 feet and a square end cross section of about 1 foot by 1 foot. The container was substantially equally divided into a removable top portion and a bottom portion with a sump for collecting liquids with a 2 inch diameter drain pipe.

A polyethylene innerliner was placed inside the container to protect it from acid attack. A stainless steel basket was placed inside the container for the purpose of holding a mold in position and a perforated ¾ inch diameter polypropylene spray tube was fitted longitudinally the full length of the container. The perforations were 20 slanted overlapping slits spaced about one inch apart along the axis of the tube and directed upward toward any mold which may be placed in the said basket in a manner shown in FIG. 1 of the drawings. The slits in the tube are deep enough to provide substantially circular 0.078 inch perforations of the tube wall. A pipe was fitted to the spray tube from outside the container, and connected to the outlet port of a positive displacement pump. The suction port of the pump was connected through a selective valving system to either a tank containing liquid acid wash or a tank containing wash water.

A hot air blower was also connected to the prepared tank for the purpose of drying a mold after treatment.

A mold having a fine deposit thereon caused by exposure to a primary diamine in the presence of moisture in the air and carbon dioxide was placed within the basket contained in the container in an inverted position with the concave portion of the mold facing downwardly toward the spray tube in a manner shown in FIGS. 1 and 2 of the drawings. The top of the container was latched. The positive displacement pump was actuated to continuously force a 90 percent formic acid from a storage container into the spray tube at a flow rate of about 20 gallons per minute at about 25° C. and outwardly from its perforations at about 25 pounds per square inch gauge to forceably impinge upon the mold's contaminated surface with a pressure of about 20 pounds per square inch. The formic acid was continuously drained from the mold and returned to the storage tank.

This treatment was conducted for about 5 minutes at which time the positive displacement pump was turned off and the acid allowed to drain by gravity flow from the mold surface into the sump for about 2 minutes to a storage tank for later recycling.

The valving system was switched for the pump to force a water wash into the spray tube and out of its perforations to impinge upon and wash the acid from the treated surface of the mold for about 2 minutes. The pump was then shut off and the hot air blower actuated to dry the mold's surface for about 10 minutes.

The concave mold's contaminated surface was a flexible liner of silicone rubber used to mold polyurethane articles. The polyurethane articles were prepared by applying a liquid polyurethane reaction mixture containing a primary diamine to the mold contour, curing the reaction mixture, followed by removing the molded article therefrom. The successive molded polyurethane articles exhibited a progressively reduced gloss ranging from a gloss of about 3 gloss units for the first molded article to a gloss of about 6 gloss units for the 50th molded article. The gloss can be determined with a 60° gloss meter according to ASTM Method D 523–66T. The silicone rubber molded surface during the successive molding operations became progressively fouled as the molding operations progressed and a resulting discoloration or deposit progressively developed on the mold's surface.

As described in this example, the contaminated mold was then placed in the rectangular box shaped container and violently treated therein for 5 minutes to restore it to its original gloss of about 3 gloss units and substantially to its original surface definition by the combination of both chemical and physical action of the high pressure organic acid. Heretofore the prescribed treatment required an overnight soaking of the mold surface in the acid.

Similar experiments can be conducted with mold surface contaminates caused by the other primary diamines described in this specification by the required violet treatment with formic, acetic or propionic acid and by the method of this example and also with the inverted mold being submerged therein with substantially equivalent results.

The flexible silicone rubber mold used in the example was of the type prepared by casting a liquid room temperature vulcanizing silicone rubber over the surface of a shaped leather grained substrate. The silicone rubber was typically cured at about 25° C. for 8 hours and was easily removed from the leather grained substrate to form a flexible, self-releasing silicone rubber mold having an inner surface, the said inner surface being a negative reproduction of the leather grained surface of the said substrate. The silicone rubber mold was then typically further post-cured for about 3 days at about 250° C. and for 8 hours at about 60° C. The inner surface of the silicone rubber mold had a gloss of about 30 gloss units. The liquid room temperature curing silicone rubber used to prepare the flexible mold was prepared by mixing components A and B of RTV 588, (obtained from The Dow Corning Company), immediately prior to preparing the mold of silicone rubber. Component A comprised a mixture of a prepolymer, chain extender, stabilizers, oils and fillers. The prepolymer was a silanol terminated polyorganosiloxane, and the chain extender a polyalkoxy substituted polyorganosiloxane. Component B comprised dibutyl tin dilaurate catalyst, fillers and oils.

The polyurethane reaction mixtures used for this example was of the type prepared by mixing a polyurethane prepolymer solution with the diamine solution. The polyurethane prepolymer was of the type prepared according to the following recipe:

| Compound: | Parts by weight |
|---|---|
| 1,4-butane diol adipate having a molecular weight of about 2000 and an hydroxyl number of about 56 | 27 |
| 1,4-butane diol adipate having a molecular weight of about 1000 and an hydroxyl number of about 112 | 27 |
| 4,4'-dicyclohexyl methane diisocyanate | 21.5 |
| Dichloromethane (solvent) | 50 |
| Lacquer (a vinyl-acrylic copolymer used as a colorant pigment) | 10 |

The 4,4'-dicyclohexyl methane diisocyanate was heated to about 90° C. and mixed with the 1,4 butane diol adipate polymers which had also been preheated to about 90° C. and allowed to react for about 50 minutes at about 150° C. The mixture was then degassed for about 45 minutes at a reduced pressure of about 28 inches of mercury. This prepolymer was then dissolved in the dichloromethane to which the small amount of lacquer had been added.

Just before application to the mold substrate, the polyurethane prepolymer was mixed with about 17 parts of a curative solution which consisted of:

| Compound: | Parts by weight |
|---|---|
| Primary diamine | 20 |
| Acetone | 80 |

The primary diamine for this example is of the substituted methyl amine type compound hereinbefore described in this specification.

The polyurethane reaction mixture was then cured in the concave silicone rubber mold in a hot air oven. The molded articles were then removed from the mold with good surface definition and gloss. After repetitive molding operations, the molded articles gradually exhibited poorer surface definitions and reduced gloss as a result of the surface contamination of the mold and resulting deposits thereon. The degradation of the mold surface was a result of its exposure to the primary diamine in the presence of moisture and carbon dioxide.

While certain representative embodiments and details have been shown for the purpose of illustrating the invention, it will be apparent to those skilled in this art that various changes and modifications may be made therein without departing from the spirit or scope of the invention.

What is claimed is:

1. A method for retarding the fouling of the surface of a concave mold having a generally open mold cavity and removing resulting chemically and physically formed deposits therefrom, where the said fouling and deposits are formed by contacting the mold surface in the presence of water and carbon dioxide with a polyamine compound having primary amino groups, which comprises the sequential steps of:
    (A) positioning said mold containing said deposits thereon in a substantially inverted position in a substantially enclosed container to enable liquid contained in the mold to drain by gravity flow from its open cavity, said enclosed container having an internal spray source positioned therein directed into said open mold cavity,
    (B) actuating a high velocity jet of concentrated liquid organic acid wash containing less than about 5 weight percent water from said internal spray source into the mold's open cavity to forcibly impinge upon the concave mold surface with turbulence at a pressure of at least about 10 pounds per square inch to remove said deposits by both chemical and physical action, said acid wash being drained by gravity flow from the mold cavity, where the acid wash comprises at least one organic acid selected from at least one of the group consisting of formic acid, acetic acid and propionic acid, and where the liquid acid wash level is substantially maintained below the mold being treated, and
    (C) removing the treated mold from the container, where said mold surface is selected from solid metals and their alloys, cured millable gum silicone rubbers, cured natural rubber and rubber-like polymers, thermoplastic polymeric materials and thermoset plastic materials, where said deposits are formed by contacting said mold surface in the presence of water and carbon dioxide with a substituted methyl amine compound characterized by the test which comprises forming one liter of a solution containing from about 10 to about 20 parts by weight of the substituted methyl amine compound per 100 parts by weight of methyl ethyl ketone, aging the solution for 8 hours at 25° C., warming the solution to 40° C. and passing gaseous carbon dioxide at about 25° C. through the solution at a rate of about one gaseous liter per minute to form a turbidity in the solution within 60 minutes, and where said substituted methyl amine compound is a primary diamine in a polyurethane reaction mixture comprising said diamine, an organic polyisocyanate having an average isocyanate content of from about 2 to about 3 and a reactive hydrogen containing polymeric material having a molecular weight in the range of about 700 to about 5000 selected from polyester polyols, polyether polyols and hydroxyl terminated polymers of conjugated diene hydrocarbons having a hydroxyl functionality of 2 to 3.

2. The method of claim 1 where the velocity of the acid spray is sufficient to impinge upon the mold surface at a pressure in the range of about 15 to about 40 pounds per square inch.

References Cited

UNITED STATES PATENTS

| 3,475,217 | 10/1969 | Watters | 264—39 |
| 2,655,929 | 10/1953 | Herold | 134—22 R |
| 3,033,712 | 5/1962 | Brevik | 134—34 |
| 3,192,074 | 6/1965 | Newhard, Jr. | 134—34 |

ROBERT F. WHITE, Primary Examiner

G. AUVILLE, Assistant Examiner

U.S. Cl. X.R.

134—3, 22 R, 34, 41